W. B. FOGH.
CAN HEAD CUTTING MACHINE.
APPLICATION FILED AUG. 12, 1918.

1,325,983.

Patented Dec. 23, 1919.
4 SHEETS—SHEET 1.

INVENTOR
WALTER B. FOGH
BY
Henry L. Reynolds
ATTORNEY

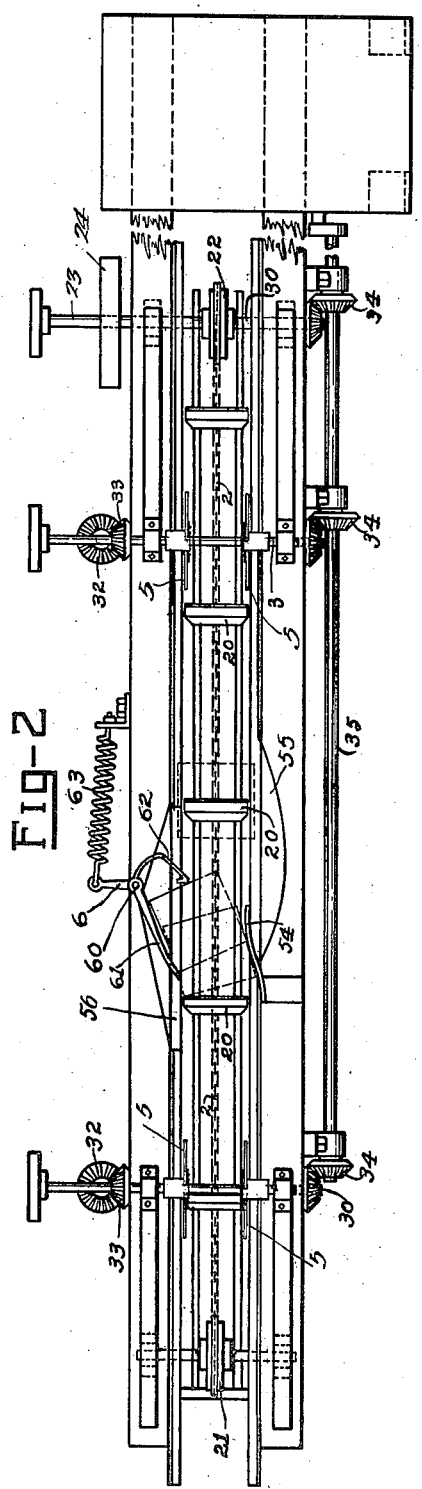

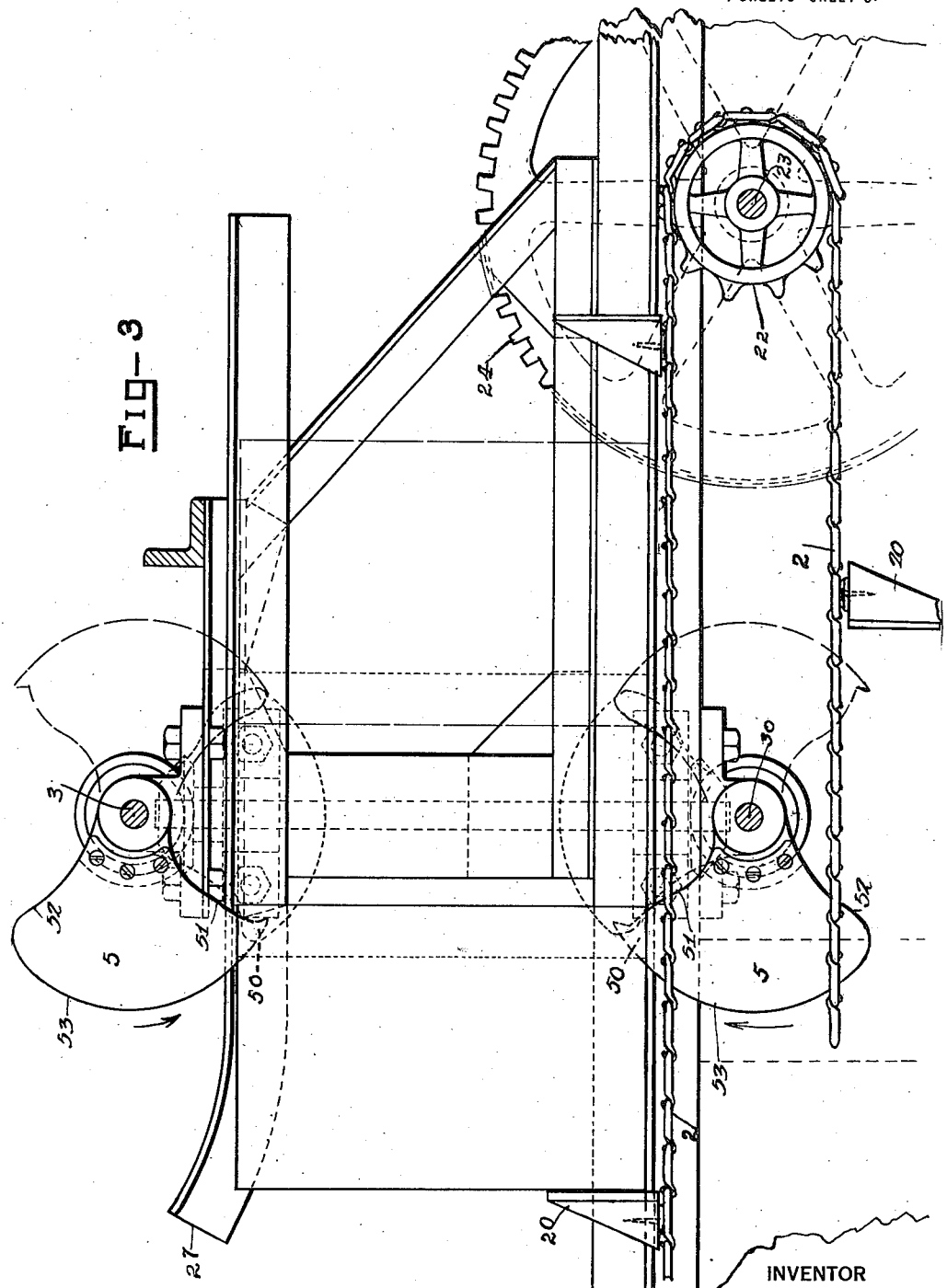

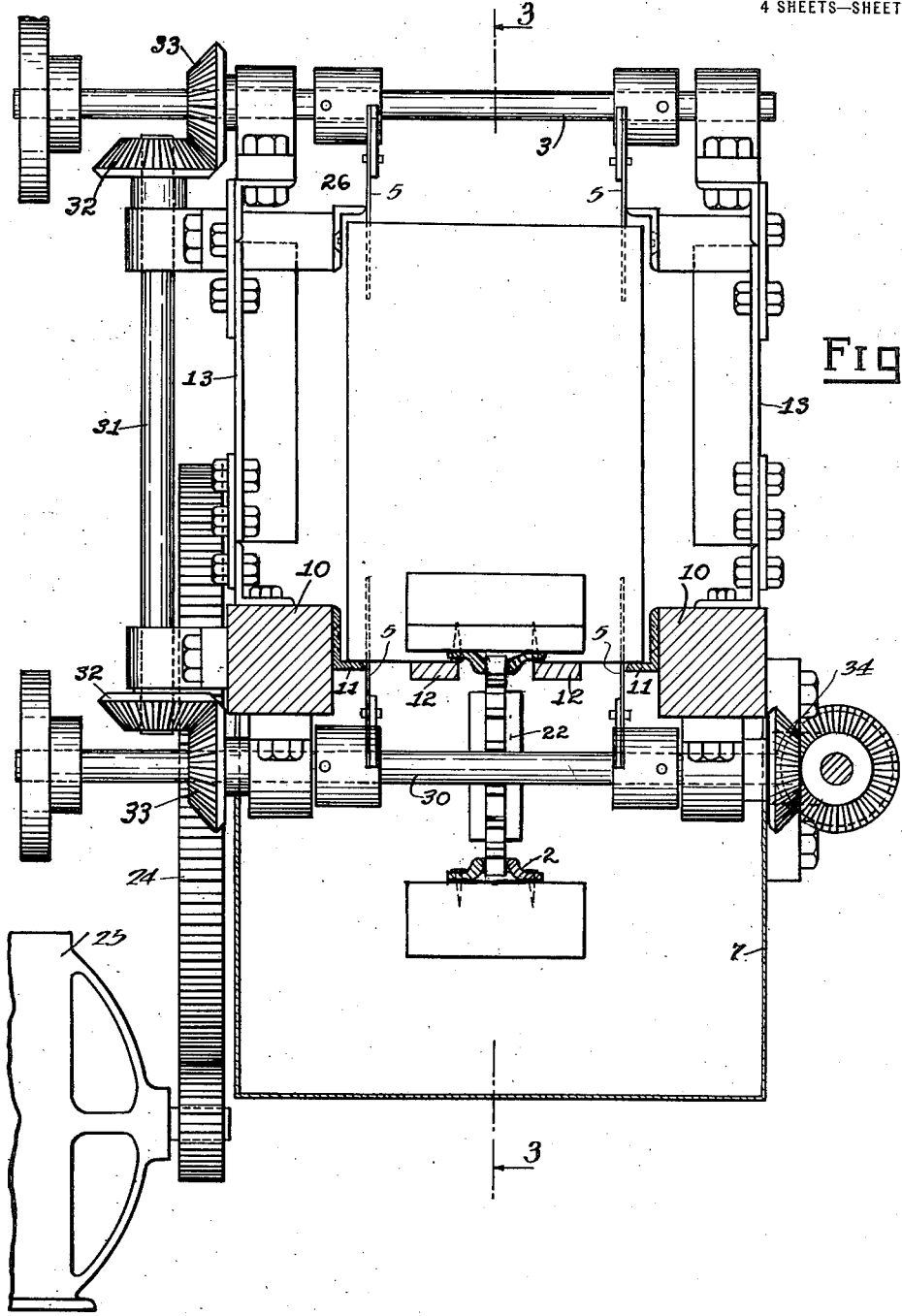

UNITED STATES PATENT OFFICE.

WALTER B. FOGH, OF SEATTLE, WASHINGTON.

CAN-HEAD-CUTTING MACHINE.

1,325,983.      Specification of Letters Patent.      Patented Dec. 23, 1919.

Application filed August 12, 1918. Serial No. 249,487.

*To all whom it may concern:*

Be it known that I, WALTER B. FOGH, a citizen of the United States, and resident of the city of Seattle, county of King, and State of Washington, have invented certain new and useful Improvements in Can-Head-Cutting Machines, of which the following is a specification.

My invention relates to a machine, the purpose of which is the cutting of the heads of cans so as to rapidly discharge the contents thereof.

The object of my invention is to provide a machine for doing this work which will be of improved construction and which is capable of working reliably and rapidly so as to handle a large number of cans.

My invention comprises the parts and combinations of parts which will be hereinafter described and then particularly pointed out in the claims.

In the accompanying drawings I have shown my invention embodied in the form of construction which I now most prefer to use, the same illustrating the principles of my invention.

Fig. 2 is a top or plan view of the same.

Fig. 3 is a longitudinal section showing, on an enlarged scale, a portion of the machine, the same including one set of the cutting knives.

Fig. 4 is a transverse section of the machine showing one set of the cutting knives and their relation with the can.

Figure 1:
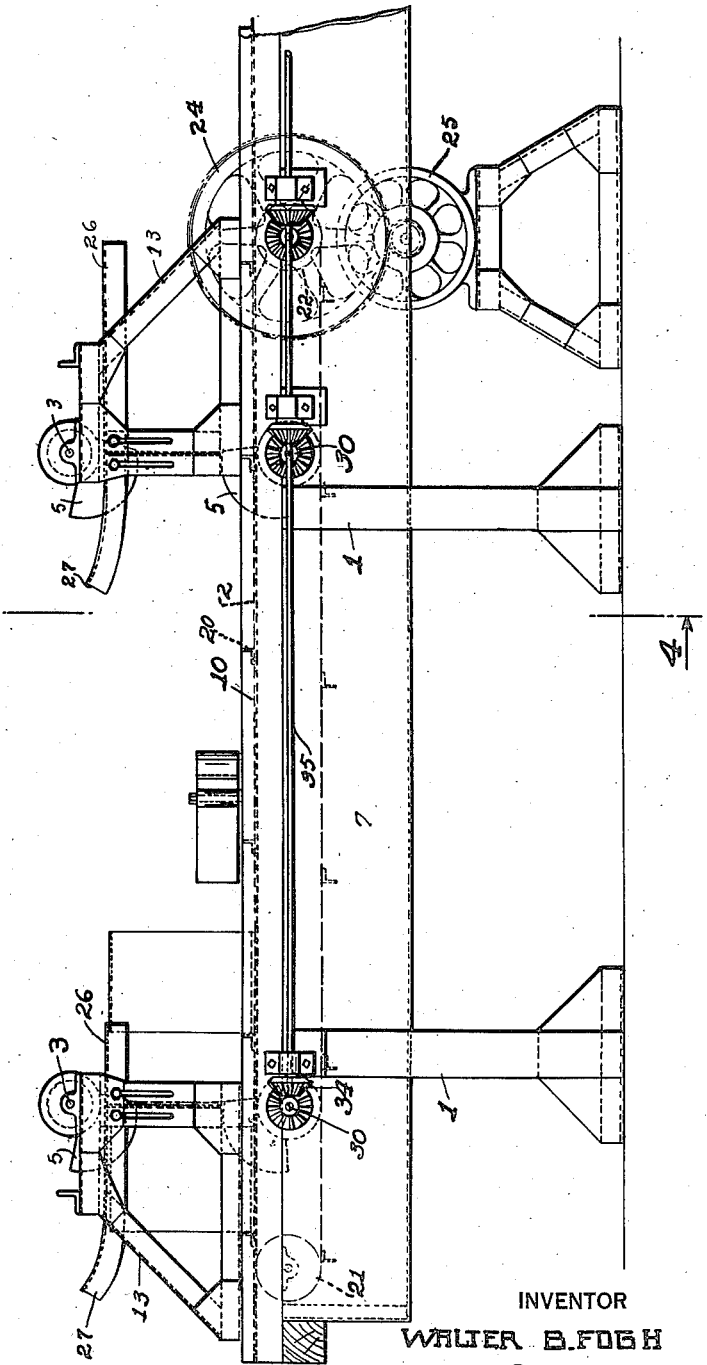
Figure 1 is a side elevation of the machine.

The particular type of can for the handling of which this machine has been designed and illustrated in the accompanying drawings, is a square can. What is desired to accomplish with this machine is to cut the heads of the cans upon three or four sides, as the case may be, thus permitting the oil to quickly flow out and putting the can in shape so that its sides may be collapsed or crushed together, thus reducing the can to a flat sheet.

Mounted upon the frame 1, which may be of any construction found suitable, is the longitudinal guide way or chute which, as herein shown, consists of two separated and parallel bars 10 having secured to the inner or adjacent sides thereof, angle bars 11, which thus form two inwardly projecting ledges upon which the can rests and by which angle bars the can is guided in its progress through the machine. As supplementary holding means for the can I may employ bars 12 spaced between the guide bars 11 and engaging the bottom end of the can toward its central portion.

In conjunction with the guide way or chute described I employ a conveyer or means for moving the cans lengthwise this chute, said conveyer being synchronized with the head cutting blades so as to present the cans in properly lined relation to the blades, so as to secure proper location of the cuts in the heads of the cans. The conveying means herein shown consists of an endless belt or chain 2, which is provided at regular intervals thereon with cross bars or flights 20. This chain passes over wheels 21 and 22 at each end of the chute, one of these, as the wheel 22, being mounted upon a drive shaft 23 which is turned by connection with any suitable source of power. As herein shown, the gear wheel 24 is secured upon the shaft 23 and this meshes with a pinion carried by the shaft of the motor 25. The manner of applying power to turn this shaft is, however, immaterial.

A frame 13 is provided toward each end of the chute, this being provided with bearings for an elevated shaft 3. In the main frame 1 is a corresponding shaft 30, these shafts being parallel with each other, one above and the other below the chute. These shafts are driven in such a manner as to synchronize with the movement of the conveyer 2. As herein shown, a vertical shaft 31 is provided at each end with bevel gears 32, which bevel gears mesh with companion bevel gears 33 carried by the two shafts 3 and 30. The two shafts 30 at opposite ends of the machine are connected to turn together by bevel gears 34 and connecting shaft 35, or by any other suitable mechanism which is accurate and which will drive them uniformly.

Upon each of the shafts 3 and 30 are secured the can-head cutting blades 5, their number depending upon a number of circumstances, as upon whether all or part of the sides of the can head are to be cut. As herein illustrated, I have shown two of these cutting blades upon each shaft, these being placed so as to simultaneously cut opposite sides of the head. It is evident that by placing the cans half the distance apart upon the conveyer I can double the number of knives, placing a second set diametrically opposite the set shown in full lines, or in the position shown by the broken lines. This will cut twice as many cans without increasing the speed of the machine. These cutting blades 5 are best shown in Fig. 3. They are in the form of segments of a disk.

The corner which enters the can head is provided with a point 50, whereby it more readily makes the first perforation. The flanks 51 and 52 and the peripheral edge 53, are all sharpened. The point 50 strikes the head a short distance inward from the advancing side of the can. The downward movement of the knife causes a sliding of the edge 51 through the head, which cuts the head back to the advancing edge of the can. As the following carrier or edge 52 of the knife leaves the head, this edge is also drawn over this end of the cut and insures cutting it back close to the following edge of the can.

I have found by practical use that the special shapes described have a beneficial effect upon the operation of the knife. The point 50 makes it much easier to enter the can while the sharpening of the edges 51 and 52 contribute materially in insuring the extension of the cut.

The two shafts 3 and 30 are, by the mechanism illustrated, turned in opposite directions. The driving mechanisms for these shafts is such that in the machine shown, they make one revolution for the passage of each can by the conveying mechanism. If a duplicate set of oppositely placed knives were used, the cans would be spaced at half the distance upon the conveyer and two cans would be cut at each revolution of the shafts.

Each knife is of such a size and so placed that it makes a cut through the can head extending substantially throughout one side and close to the side wall of the can. The distance of this cut from the side wall of the can will depend upon the uniformity of the size of the cans and also the desirability of cutting close to the side edge.

To insure a better support for the upper end of the can while the cutting operation is under way, I have provided guide bars 26 which are herein shown as consisting of two angle bars which lie close against the corners of the can. The ends of these bars, which are at the receiving end of the guides, are bent outward, as shown at 27, thus enlarging the opening of the chute.

Farther down along the chute a companion pair of shafts, with cutting blades of similar construction to that described, are located. Between these two pairs of cutting blades is located a device having for its purpose the turning of the cans one quarter way around, so that when the can is presented to the second set of cutting blades, the sides of the head not previously cut, will be cut. If in each of these sets of cutting blades two knives are mounted upon each shaft then all four sides of the head will be cut. If however, one of the blades be omitted from one of the shafts, only three sides of the head will be cut. The number of blades employed will depend therefore upon whether it is desired to entirely cut out the head or to leave it attached by one side.

In Figs. 1 and 2 is shown a can turning means. A section 56, at one side of the chute has the vertical flange cut away. A corresponding segment at the opposite side of the chute has this flange cut away or bent backward so as to form a circular segmental recess 55. Pivoted at one side of the chute alongside of the recess and the opening in the side of the chute, is a lever 6, this being mounted upon the pivot 60. This lever has an arm 61 which extends backward in the direction from which the cans are received. It also has a bent arm 62 which, when the lever is in normal position, projects into the path of movement of the can. It, however, lies close to one side of the chute, sufficiently close as not to engage the flights 20 of the conveyer. A spring 63 connects this lever with a member of the frame and normally holds it in position such that the arm 62 lies close along one side of the chute and yet projects into the chute a sufficient distance to insure its being engaged by the can in its passage.

As the can comes along, impelled by one of the flights 20 of the conveyer, it engages the arm 62 of this lever and pushes it ahead of it. This turns the lever upon its pivot 60 and causes the arm 61 to engage with the adjacent side of the can after the manner which is indicated in Fig. 2. To assist in this action a spring bar 54 is mounted at the opposite side of the chute and has its end projecting slightly into the chute so as to engage the can and force it slightly to the opposite side of the chute. As the result of engaging with the two arms 61 and 62 of the lever 6 and the forward movement imparted by the conveyer, the can is turned one quarter way around. It is thus presented to the second set of cutting knives in such manner as to cut the two sides which were not cut by the first set of knives.

Extending beneath the conveyer, for whatever distance may be necessary, is a trough 7 into which the contents of the cans are discharged. From this trough it is conveyed to tanks or to any point desired. The hand labor required in the operation of this machine is simply such as would be required to place the can in the chute and to remove the cans after they have had their heads cut. Its capacity, is therefore, quite considerable.

It is believed that the operation of the machine is evident and that further specific explanation thereof is not required.

What I claim as my invention is:

1. In a can cutting machine, in combination, a can guiding chute, means for conveying the cans through said chute in suitably spaced relation, revolving segmental knives and means for synchronously operating said knives and the can conveying mechanism.

2. In a can head cutting machine, in combination, a rotating shaft, two segment disk knives secured to said shaft, and spaced apart so as to cut just within opposite side margins of the can heads.

3. In a can head cutting machine, in combination, a rotating shaft, two segment disk knives secured to said shaft, and spaced apart so as to cut just within opposite side margins of the can heads, the rearward corner of said segment disks being rounded over and sharpened well up on the flank.

4. In a can head cutting machine, in combination, a can conveyer having means for regularly spacing the cans, can-head cutting knives spaced apart to permit the cans passing between them, and means synchronized with the conveyer for operating said knives.

5. In a can-head cutting machine, in combination, a can conveyer having means for regularly spacing the cans, two sets of can head cutters spaced apart lengthwise of the conveyer, means for operating the knives synchronized with the conveyer and means for giving the cans a quarter turn in their passage between the two sets of cutters.

6. In a can-head cutting machine, in combination, a can chute, means for passing the cans through said chute at regularly spaced intervals, two sets of can-head cutting means separated lengthwise of said chute and means for operating said means synchronized with the can conveying means, and an arm pivoted alongside of the chute to engage the cans between said sets of knives to give the cans a quarter turn.

7. In a can head cutting machine, in combination, a can chute, means for passing the cans through said chute at regular spaced intervals, a set of can-head-cutting means consisting of two shafts placed at opposite sides of the chute, knives carried by said shafts and means for synchronizing the rotation of said knives with the passage of the cans through the chute to cut the can heads in passing.

8. In a can head cutting machine, in combination, a chute composed of two parallel angle bars adapted to receive and support the cans by their edges, a conveyer chain traveling between said angle bars and having regularly spaced flights thereon, a shaft beneath and a shaft above and both extending transversely across said chute, two segment knives carried by each shaft, said knives and shafts being spaced to engage the knives with the heads just within their marginal edges, and synchronized driving means for shafts and conveyer chain.

Signed at Seattle, Washington, this 6th day of August, 1918.

WALTER B. FOGH.